(12) United States Patent
Nene et al.

(10) Patent No.: US 10,944,337 B2
(45) Date of Patent: Mar. 9, 2021

(54) ADAPTIVE ZERO VOLTAGE SWITCHING (ZVS) LOSS DETECTION FOR POWER CONVERTERS

(71) Applicant: Texas Instruments Incorporated, Dallas, TX (US)

(72) Inventors: Hrishikesh Ratnakar Nene, Katy, TX (US); Salil Chellappan, Bangalore (IN); Zhong Ye, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 16/220,724

(22) Filed: Dec. 14, 2018

(65) Prior Publication Data

US 2019/0199240 A1    Jun. 27, 2019

Related U.S. Application Data

(60) Provisional application No. 62/599,537, filed on Dec. 15, 2017.

(51) Int. Cl.
*H02M 7/5395* (2006.01)
*H02M 7/219* (2006.01)
*H02M 1/00* (2006.01)

(52) U.S. Cl.
CPC ......... *H02M 7/5395* (2013.01); *H02M 7/219* (2013.01); *H02M 2001/0038* (2013.01); *H02M 2001/0058* (2013.01)

(58) Field of Classification Search
CPC . H02M 2001/0058; H02M 2007/4815; H02M 2005/2935; H02M 7/4826; H02M 2007/4811; H02M 1/083; H02M 1/047; H02M 7/5395; H02M 7/219; H02M 2001/0038
See application file for complete search history.

(56) References Cited

U.S. PATENT DOCUMENTS

| | | | |
|---|---|---|---|
| 9,929,663 B1* | 3/2018 | Babazadeh | H02M 3/33592 |
| 2004/0196049 A1* | 10/2004 | Yano | G09G 3/2085 324/523 |
| 2014/0286056 A1* | 9/2014 | Yoon | H02M 3/33569 363/21.03 |
| 2016/0241132 A1* | 8/2016 | Lin | H02M 1/4225 |
| 2017/0040900 A1* | 2/2017 | Vaughan | H02M 3/33507 |

* cited by examiner

*Primary Examiner* — Peter M Novak
(74) *Attorney, Agent, or Firm* — Brian D. Graham; Charles A. Brill; Frank D. Cimino

(57) ABSTRACT

A device [200] is configured to detect a zero voltage switching (ZVS) circuit [110] output that includes a hard switching signal. The hard switching signal [114] includes a false signal [116] and a spike signal [118]. Thereafter, the device generates digital pulse signals [312/314] that correspond to the false signal and the spike signal. Accordingly, the device filters the generated digital pulse signal that corresponds to the false signal [312], and uses the digital pulse signal [314] that corresponds to the spike signal for adjusting a timing [132] of a pulse width modulation (PWM) switching cycle [Vgs].

14 Claims, 3 Drawing Sheets

US 10,944,337 B2

ADAPTIVE ZERO VOLTAGE SWITCHING (ZVS) LOSS DETECTION FOR POWER CONVERTERS

RELATED APPLICATIONS

This application claims the benefit of priority of U.S. Provisional Patent Application No. 62/599,537 filed Dec. 15, 2017, incorporated herein by reference.

BACKGROUND

Certain power conversion circuits accomplish higher efficiencies by implementing a mechanism that accomplishes switching at zero voltage. These power conversion circuits employ, for example, mechanisms to avoid power losses. In certain instances, power losses in a switch are due to a product of a voltage that is applied across the switch and the current flowing through the switch. That is, the power losses occur during the transition from ON state to OFF state, and vice versa.

For example, mechanisms to avoid power losses require additional circuits that can take up additional chip real estate on the power conversion circuits. Furthermore, these additional circuits can have complex calculations resulting in complex control, reduced efficiency and increased size and cost.

SUMMARY

Described herein is a technology for detecting presence of a switching loss in a zero voltage switching (ZVS) circuit. For example, the ZVS circuit generates a hard switching signal that includes a false signal and a spike signal. A sensor coupled to the ZVS circuit detects the hard switching signal and uses a low-pass filter to magnify and to generate the false signal and the spike signal. A comparator uses a reference signal to generate digital pulse signals corresponding to the false signal and the spike signal. A blanking component will then filter the generated digital pulse signal that corresponds to the false signal. Accordingly, a central processing unit (CPU) will adjust a timing of a pulse width modulation (PWM) signal based on the digital pulse signals corresponding to the spike signal.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

DETAILED DESCRIPTION

In an embodiment, a sensor circuit uses a resistance-capacitor (RC) circuit to detect and magnify an output signal of a zero voltage switching (ZVS) circuit. The output signal, for example, includes a hard switching signal that further includes a false signal and a spike signal.

The output signal from the sensor circuit is supplied to a comparator in conjunction with a reference voltage from a digital to analog converter (DAC) component. In this case, the comparator generates digital pulse signals that correspond to the false signal and the spike signal. In an embodiment, a blanking component filters the generated digital pulse signal that corresponds to the false signal. In other words, the blanking component outputs the generated digital pulse signal that corresponds to the spike signal.

Based on the output of the blanking component, a CPU utilizes output of the blanking component to adjust a timing of a pulse width modulation (PWM) signal.

Figure 1:
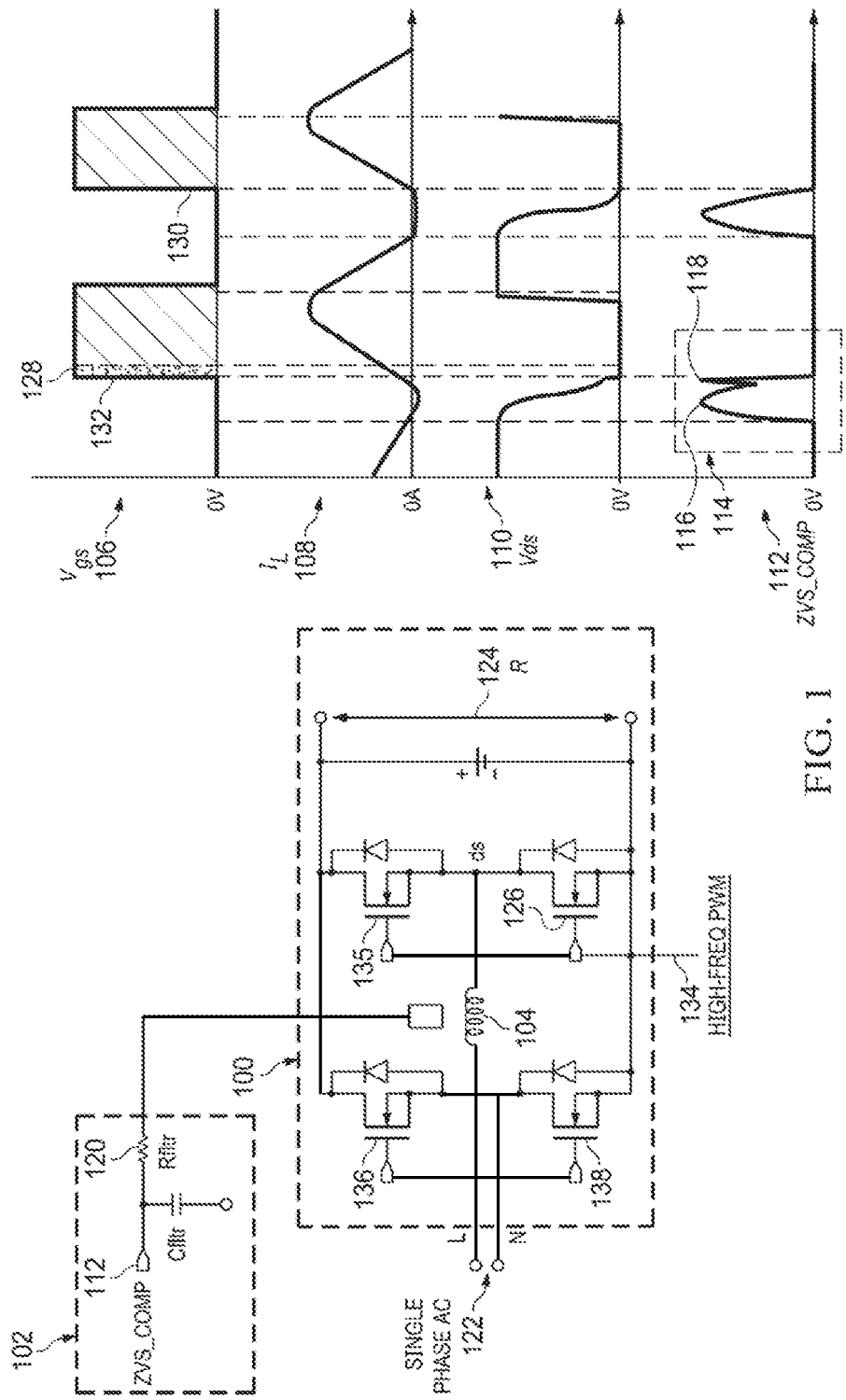
FIG. 1 is a block diagram of a zero voltage switching (ZVS) circuit that generates hard switching signals as described in implementations herein.

FIG. 1 is an example implementation of a ZVS circuit (ZVS circuit 100) that generates hard switching signals as described in present implementations herein. In an embodiment, the hard switching signals include oscillation signals that can result in switching or power losses in a power converter.

As shown, a sensor 102 is coupled to the example ZVS circuit 100, and particularly to an inductor 104 of the ZVS circuit 100. FIG. 1 further depicts signal graphs that derived from the ZVS circuit 100. For example, these signal graphs include a gate-source voltage (Vgs) 106 signal graph, an inductor current ($I_L$) 108 signal graph, and a detected output signal or ZVS_detect, or drain-source voltage (Vds) 110 signal graph that includes a measured voltage across nodes of the inductor 104.

FIG. 1 shows the signal graph that is derived from an output of the sensor 102. As depicted, the output of the sensor 102 is represented as a comparator input signal (ZVS_COMP) 112 that includes a hard switching signal 114, which is derived from the magnified voltage across the nodes of the inductor 104. The hard switching signal 114 further includes a false signal 116, and a spike signal 118. Sensor 102 utilizes a resistance-capacitance (RC) circuit 120 to magnify the detected output signal Vds 110. In an embodiment, this filtering is used to magnify and to accurately detect presence of the false signal 116 and the spike signal 118. The magnification, in this example, includes generating an output signal based from an absolute value of equivalent voltages of the false signal 116 and the spike signal 118.

In an embodiment, the ZVS circuit 100 is a power converter component that is used to control power going to a load. As depicted, the ZVS circuit 100 controls a PWM signal 122 (e.g., single phase AC signal) in delivering power to a load (R) 124. During the process of delivering power to load (R) 124, the ZVS circuit 100 generates hard switching signals. These hard switching signals include oscillations at high frequencies and can generate switching losses in the power delivery to the load (R) 124. The presence of the hard switching signal 114 can be detected by identifying existence of the spike signal 118 at the ZVS circuit 100. Thereafter, a timing adjustment in the PWM switching cycle is implemented on the ZVS circuit 100 to lessen switching or power losses as further described below.

Referencing the signal graph—Vgs 106, and during a positive input cycle of the PWM signal 122, the signal graph—Vgs 106 is derived, for example, from a first MOSFET 126. In this example, a small amount of gate voltage—Vgs 106 is applied to the first MOSFET 126. Corresponding to this small amount of gate voltage—Vgs 106, the detected Vds 110 from the inductor 104 includes a high voltage, while the sensor output—ZVS_COMP 112 may initially detect absence of the hard switching signal 114 as shown by an initial 0.0 V ZVS_COMP 112.

At an end of a PWM switching cycle as indicated by a rising edge 128 of the Vgs 106 signal, and where the PWM switching cycle begins to turn ON, the hard switching signal 114 is detected as shown by ZVS_COMP 112. For example, the PWM switching cycle begins to turn ON too soon as shown by the rising edge 128 of the Vgs 106. In this example, the rising edge 128 occurs before the ZVS-detect 110 signal is 0V.

As depicted, on a subsequent rising edge 130, a timing adjustment is implemented so that the rising edge 130 begins to turn ON when the Vds 110 signal is at 0.0 V. The timing adjustment includes, for example, a width of a shaded block 132. In this example, the timing adjustment is processed by a central processing unit (not shown) and fed back to the ZVS circuit 100 through a high-frequency PWM switch controller 134.

In an embodiment, the high-frequency PWM switch controller 134 is configured to receive timing adjustment signals (not shown) from the central processing unit. The timing adjustment signals, for example, facilitates the first MOSFET 126 to turn ON when the Vds 110 signal is at 0.0 V. In this example, and during the positive input cycle of PWM signal 122, the first MOSFET 126 becomes active, a MOSFET 135 acts as synchronous MOSFET, a MOSFET 138 is continuously turned ON, while the MOSFET 136 is turned OFF. During the negative input cycle, the MOSFET 135 is active, the MOSFET 126 acts as synchronous MOSFET at switching PWM frequency, MOSFET 136 is continuously turned ON while MOSFET 138 is turned OFF.

In an embodiment, the hard switching signals 114 is represented by the false signal 116 and the generated spike signal 118, which includes oscillation signals or power losses in the ZVS circuit 100. For example, the spike signal 118 indicates power losses or sudden spike of voltages due to oscillation of the inductor current ($I_L$) 108 when the PWM switching cycle is about to turn ON. In this example, the sudden spike of voltages of the spike signal 118 includes a timing that occur relative to the end of the cycle period. For example, the end of the cycle period is indicated by the rising edge 128 or the rising edge 130.

As described herein, the sensor 102 is configured to detect presence of the hard switching signal 114. For example, the sensor 102 detects occurrence of the spike signal 118 that includes a short duration of high voltage oscillating signal at a particular timing relative to the end of the cycle period.

In an implementation, the sensor 102 utilizes the RC circuit 120 to filter high frequency noise to derive a snap shot of the magnified ZVS_detect or Vds 110 signal graph, and thereby generates the ZVS_COMP 112 based from the magnified Vds 110 signal graph. For example, RC circuit 120 is configured to generate the hard switching signal 114 based from the magnified voltages of the Vds 110 signal graph. In this example, the resulting output of the RC circuit 120 (i.e., signal graph of the ZVS_COMP 112) may be received by a comparator component for further processing as described below. The ZVS_COMP 112 is a result of a very slightly filtered version of the di/dt across the inductor 104. When there is an abrupt transition in Vds 110, the inductor di/dt causes a big voltage spike across the inductor 104, as shown by spike signal 118 in waveform 112. The false signal 116 of ZVS_COMP 112 112 is added because of other parasitic elements present in sensor 102. When there is no abrupt transition in the Vds 110 voltage, as shown in the 2nd period of operation in the waveform ZVS_COMP 112, there is no spike on the 112 signal. This indicates proper zero voltage operation.

Figure 2:
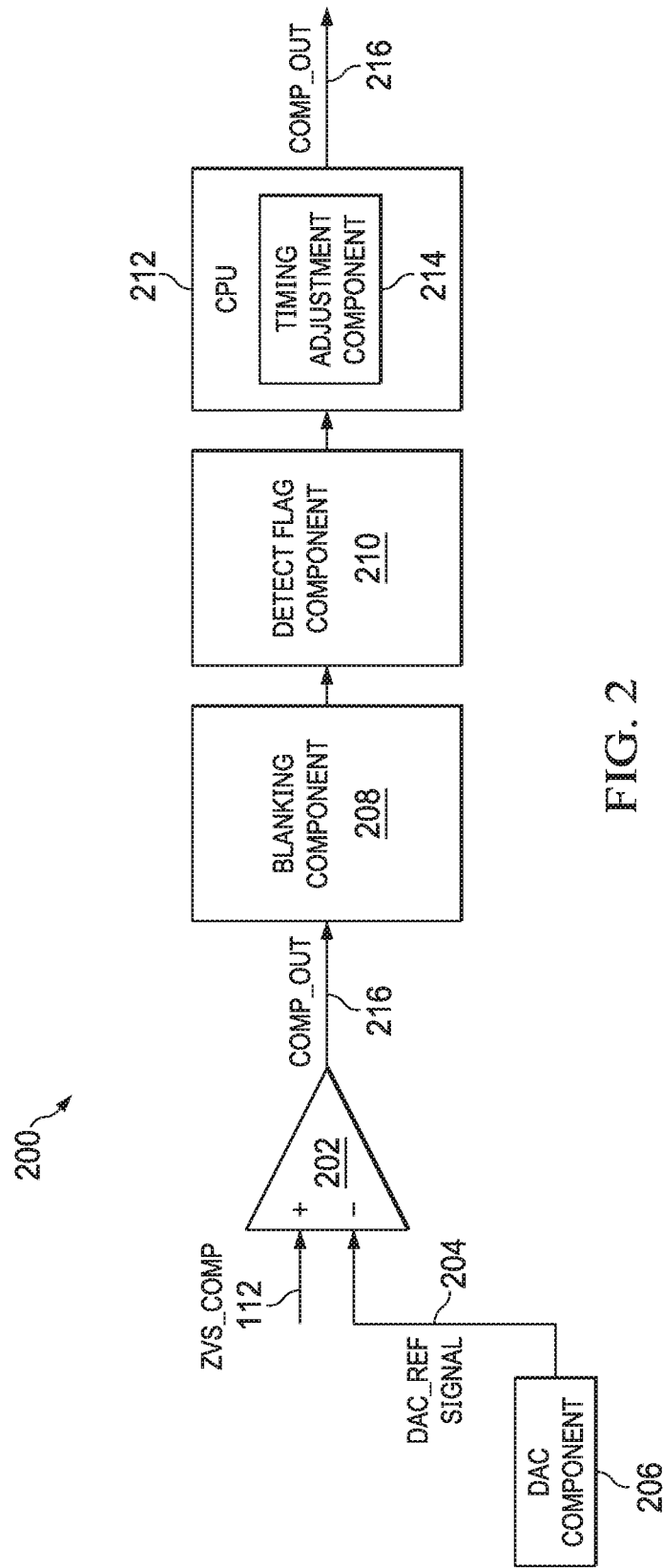
FIG. 2 is a block diagram detector device as described herein.

FIG. 2 illustrates an example detector device 200 as described herein. In an embodiment, the detector device 200 is an adaptive ZVS loss detector device or circuit that implements PWM timing adjustment based on the detected hard switching signal. As shown, the detector device 200 includes a comparator 202 that receives: the ZVS_COMP 112 from the sensor 102 of FIG. 1; and a DAC reference signal 204 from a DAC component 206. The detector device 200 further includes a blanking component 208, a detect flag component 210, and a CPU 212 with a timing adjustment component 214. The timing adjustment component 214, for example, is fed back to the ZVS circuit 100 to correct the timing of the rising edge where the hard switching signal 114 is detected as described herein.

In an embodiment, the comparator 202 includes a component that compares two analog voltages or currents, and outputs a digital output signal—COMP_OUT 216 that may be a subject of further signal processing. For example, the comparator 202 receives and compares the ZVS_COMP 112 to the reference signal 204. In this example, the output digital pulse signal COMP_OUT 216 of the comparator 202 includes a zero or high voltage depending upon whether a certain threshold value of the reference signal 204 is reached by the ZVS_COMP 112.

For example, the threshold value is slightly below the detected false signal 116 and spike signal 118 of the hard switching signal 114 of the comparator input ZVS_COMP 112. In this example, the comparator 202 generates a zero voltage output for the detected ZVS_COMP 112 signals that are below the threshold value. In this example still, the digital output of the comparator 202 includes high digital output when the detected peak signals are equal to or greater than the threshold value.

Having obtained the output digital signal COMP_OUT 216 of the comparator 202, the blanking component 208 is configured to filter the digital output signals that correspond to the false signal 116. In an embodiment, the blanking component 208 generates the digital output signal that corresponds to the spike signal 118. In this embodiment, the blanking component 208 provides an output that indicates presence or absence of the spike signal 118 from the received COMP_OUT 216 of the comparator 202.

For example, referencing the hard switching signal 114 of the ZVS_COMP 112, the comparator 202 outputs two high digital outputs corresponding to false signal 116 and the spike signal 118 of the hard switching signal 114. The first high digital output corresponds to false signal 116, while the second high digital output corresponds to the spike signal 118. In this example, the blanking component 208 is configured to filter the high digital output that corresponds to false signal 116. Generally, the spike signal 118 includes a lesser pulse width or time of occurrence as compared to the digital output that corresponds to the false signal 116. The reason being, the spike signal 118 includes a sudden burst of power that has a lesser period or pulse width as compared to the false signal 116.

As described herein, the blanking component 208 may be configured to use a second threshold in detecting whether the high digital output corresponds to the spike signal 118. For example, the second threshold is based upon the pulse width of the high digital output. In this example, the high digital output for the spike signal 118 has a shorter pulse width as compared to the false signal 116 of the hard switching signal 114. Accordingly, the blanking component 208 detects and leaves out the high digital output that corresponds to the spike signal 118.

In another embodiment, the blanking component 208 detects the digital output that corresponds to the spike signal 118 based on a sudden appearance of a high voltage on the ZVS_COMP 112. For example, the appearance of the high voltage occurs on a particular timing relative to the end of the cycle period. In this example, the second threshold includes the timing (i.e., time period) relative to the end of the cycle period, which is the rising edge 128 or 130 of the PWM switching cycle or Vgs 106. Afterwards, the blanking component 208 filters the digital output other than the digital output that corresponds to the detected spike signal 118.

As described herein, the detect flag component 210 includes a binary field that indicates presence of the high digital output that corresponds to the spike signal 118. For example, a binary digit "1" corresponds to presence of the spike signal 118, while a binary digit "0" indicates otherwise.

The detect flag component 210 is further configured to include exact time of occurrence of the spike signal 118. In an embodiment, the detect flag component 210 includes additional fields that may indicate timing and time of occurrence of the spike signal 118 from the output of the blanking component 208. In this embodiment, the time and occurrence of the spike signal 118 is utilized by the CPU 212 for further adjustment of the second threshold that is used by the blanking component 208.

For example, the spike signal 118 is observed to be occurring exactly at each end of the cycle period. In this example, the CPU 212 may adjust the second threshold to include each end of the cycle period. The CPU 212 transmits this adjusted to the blanking component 208, and the blanking component 208 may focus on end of each cycle period in order to detect presence of the spike signal 118.

Thereafter, the CPU 212 and the timing adjustment component 214 facilitate adjustment of parameters of the PWM switching cycle based on the determined presence of the spike signal 118. For example, at next PWM switching cycle, the timing of the rising edge 130 is adjusted based on the presence of the detected spike signal 118 when the rising edge 128 occurred too soon as depicted in FIG. 1 above. In this example, the timing adjustment component 214 includes a delay in the rising edge 130 in the next PWM switching cycle. The delay, for example, is defined by the width of the shaded block 132.

Figure 3:
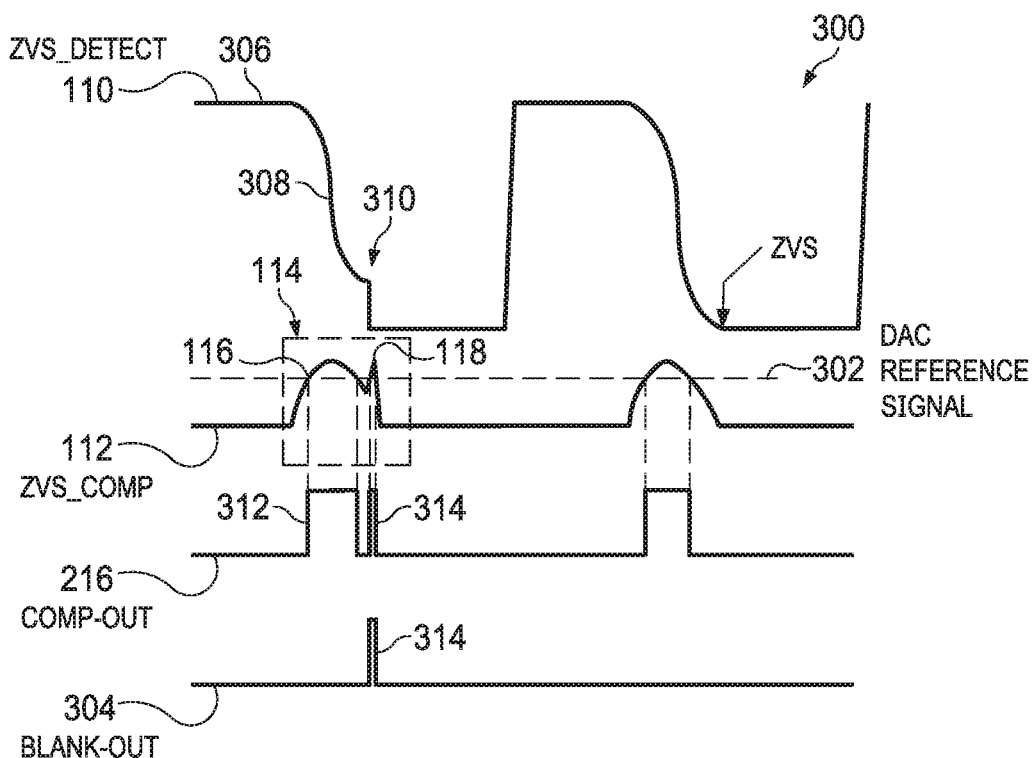
FIG. 3 are signal graphs showing signal processing from a zero voltage switching (ZVS) circuit to a blanking component as described herein.

FIG. 3 illustrates example signal graphs 300 showing signal processing from the ZVS circuit 100 to the blanking component 208 as described herein. Particularly, the signal graphs 300 includes the ZVS_detect or Vds 110 which is the output signal of the ZVS circuit 100, the ZVS_COMP 112 which is the output signal of the sensor 102, a reference signal 302 which is supplied by the DAC component 206, the COMP_OUT 216 which is the output signal of the comparator 202, and a Blank_OUT 304 which is an output signal of the blanking component 208.

The ZVS_detect or Vds 110 includes the detected voltage from the inductor 104 of the ZVS circuit 100. As depicted, a voltage 306 indicates the voltage during the time that the gate-source voltage (Vgs) 106 of a metal oxide semiconductor field effect transistor (MOSFET) is at OFF state; however, when the gate-source voltage (Vgs) 106 begins to rise as indicated by the rising edge 128, and the first MOSFET 126 transitions into the ON state, a decreasing voltage 308 from the ZVS circuit 100 shows the voltage to be diminishing in value until a loss 310 is reached. The loss 310 includes oscillations signals when the rising edge 128 occurred too soon before the ZVS_detect or Vds 110 reached 0V.

Referencing the ZVS_COMP 112, the decreasing voltage 308 and the loss 310 correspond to the false signal 116 and the spike signal 118, respectively. Furthermore, with reference to the COMP_OUT 216, the false signal 116 and the spike signal 118 correspond to a first digital pulse 312 and a second digital pulse 314, respectively.

In an implementation, the blanking component 208 is configured to filter and remove all digital pulses or digital output signals other than the digital output signal that corresponds to the spike signal 118. For example, the blanking component 208 may utilize a threshold that differentiates the digital pulses or digital output signals between the false signal 116 and the spike signal 118. In this example, the threshold is based on the pulse width of the digital output signals. In other embodiment, the threshold may be based upon a sudden appearance of a surging voltage like the spike signal 118. Still, in another embodiment, the threshold is based upon a timing of the spike signal 118 relative to the end of the cycle period.

Based on the threshold, the blanking component 208 filters the first digital pulse 312 that corresponds to the false signal 312, and outputs the second digital pulse 314 that corresponds to the spike signal 118.

Thereafter, the output of the blanking component 208 is used by the CPU 212 and the timing adjustment component 214 to adjust parameters of the PWM. For example, at next PWM cycle, the timing of the PWM is adjusted based on the presence of the detected spike signal 118.

Figure 4:
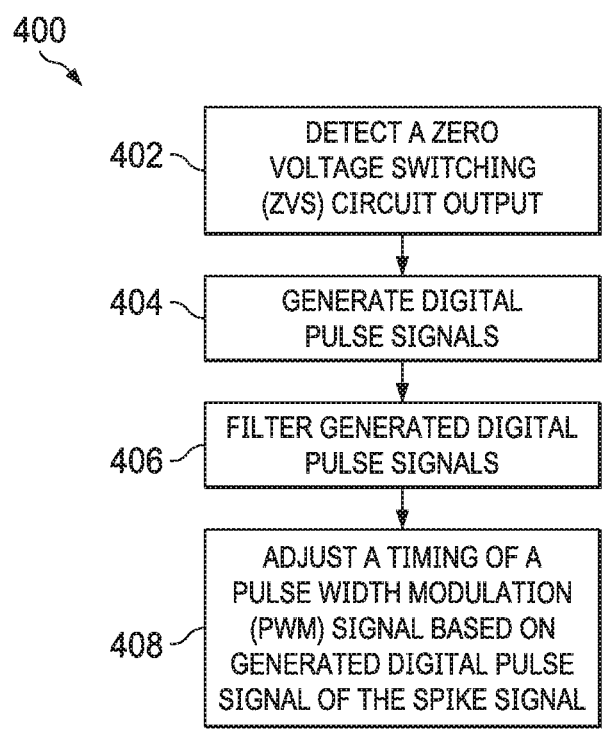
FIG. 4 is a process chart illustrating an example method for detecting a zero voltage switching (ZVS) loss by a detector device in a power converter as described herein.

FIG. 4 shows an example process chart 400 illustrating an example method for detecting ZVS loss by the detector device 200 of the power converter as described herein. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 402, detecting by a sensor of a zero voltage switching (ZVS) circuit output that includes a hard switching signal, wherein the hard switching signal includes a false signal and a spike signal is performed. For example, the sensor 102 is coupled to the ZVS circuit 100. In this example, the sensor 102 utilizes a low-pass filter and the magnify filtered signal may be utilized to detect the hard switching signal. Thereafter, the sensor 102 generates the output signal—ZVS_COMP 112 that includes the hard switching signal 114.

As described herein, the hard switching signal 114 includes the false signal 116 and the spike signal 118. The spike signal 118 includes a sudden burst of oscillating signal that produces power losses in the ZVS circuit 100.

At block 404, generating of digital pulse signals by a comparator, wherein the digital pulse signals correspond to the false signal and the spike signal is performed. For example, the comparator 202 generates the output signal—COMP_OUT 216 that includes digital output signal of the ZVS_COMP 112 when combined to the reference signal 204. In this example, the comparator output signal—COMP_OUT 216 includes the first digital pulse 312 and the second digital pulse 314 that correspond to the false signal 116 and the spike signal 118, respectively.

At block 406, filtering by a blanking component of the generated digital pulse signal that corresponds to the false signal is performed. For example, the blanking component 208 filters the first digital pulse 312 that corresponds to the false signal 312, and outputs the second digital pulse 314 that corresponds to the spike signal 118. In this case, the second digital pulse 314 may include a lesser width as compared to the first digital pulse 312.

In an embodiment, the blanking component 208 utilizes a threshold that includes a timing of the previous spike signal 118 relative to the end of PWM switching cycle period. In this embodiment, the blanking component 208 detects the spike signal 118 whenever there is a surge in voltage at the particular timing relative to the end of the PWM cycle period. For example, the end of the PWM cycle period is indicated by the rising edge 128.

At block 408, adjusting by a central processing unit (CPU) of a timing of a PWM switching cycle based on the generated digital pulse signal of the spike signal is performed. For example, the rising edge 128 is determined to have occurred before the ZVS_detect or Vds 110 reaches 0V. In this example, the adjustment of the timing includes adjusting the rising edge (e.g., rising edge 130) to occur when the ZVS_detect or Vds 110 reaches 0V.

What is claimed is:

1. A device comprising:
   a switching circuit that includes:
      a set of power inputs;
      a set of power outputs;
      an inductor coupled between a first input of the set of power inputs and a first node;
      a first transistor that includes a gate, a drain coupled to the first node, and a source coupled to a first output of the set of power outputs; and
      a second transistor that includes a gate, a drain coupled to a second output of the set of power outputs, and a source coupled to the first node;
   a sensor coupled to the switching circuit to measure a voltage across the inductor and to provide a first comparison signal in response to the voltage across the inductor;
   a comparator coupled to the sensor to receive the first comparison signal and to provide a second comparison signal in response to the first comparison signal;
   a blanking component coupled to the comparator to filter out a first pulse of the second comparison signal in response to a pulse width of the first pulse exceeding a threshold duration and to provide a blanking output based on a second pulse of the second comparison signal in response to a pulse width of the second pulse being less than the threshold duration; and
   a CPU coupled to the blanking component to adjust a timing of a pulse width modulation (PWM) switching cycle based on the blanking output.

2. The device of claim 1, wherein the sensor comprises a resistance-capacitance (RC) circuit.

3. The device of claim 1, wherein the second pulse of the second comparison signal indicates a spike in the voltage across the inductor.

4. The device of claim 1, wherein the first pulse of the second comparison signal indicates a false signal that is filtered out by the blanking component.

5. The device of claim 1, wherein the comparator is to generate the second comparison signal as a digital signal.

6. The device of claim 1, wherein the blanking component is to provide the blanking output based on the second pulse of the second comparison signal in response to a timing of the second pulse of the second comparison signal relative to an end of a cycle period.

7. The device of claim 1 further comprising a flag detector coupled between the blanking component and the CPU to receive the blanking output and to provide a flag signal to the CPU that includes a first field indicating the second pulse of the second comparison signal.

8. The device of claim 7, wherein the flag signal further includes a second field indicating a time of occurrence of the second pulse of the second comparison signal.

9. A device comprising:
   a switching circuit that includes:
      a set of power inputs;
      a set of power outputs;
      an inductor coupled a first input of the set of power inputs; and
      a set of transistors coupled between the inductor and the set of power outputs;
   a sensor coupled to the switching circuit to provide a first comparison signal in response to a voltage across the inductor;
   a digital to analog converter (DAC) to provide a reference signal;
   a comparator coupled to the sensor to receive the first comparison signal and to the DAC to receive the reference signal, wherein the comparator is further to provide a second comparison signal in response to the first comparison signal and the reference signal;
   a blanking component coupled to the comparator to receive the second comparison signal and to produce a blanking signal in response to the second comparison signal, wherein the blanking signal filters out a first pulse of the second comparison signal based on a pulse width of the first pulse being greater than a threshold and indicates a second pulse of the second comparison signal based on a pulse width of the second pulse being less than the threshold; and
   a CPU coupled to the blanking component to adjust a timing of a pulse width modulation (PWM) switching cycle based on the blanking signal.

10. The device of claim 9, wherein the sensor comprises a resistance-capacitance (RC) circuit.

11. The device of claim 9, wherein the first comparison signal indicates a surge in the voltage across the inductor.

12. The device of claim 9, wherein the blanking component is to indicate the second pulse of the second comparison signal further based on a timing of the second pulse relative to an end of the PWM switching cycle.

13. The device of claim 9 further comprising a flag detector coupled between the blanking component and the CPU to receive the blanking signal and to provide a flag signal to the CPU that includes a first field indicating the second pulse of the second comparison signal.

14. The device of claim 13, wherein the flag signal further includes a second field indicating a time of occurrence of the second pulse of the second comparison signal.

* * * * *